US012699434B2

(12) United States Patent
Cheng

(10) Patent No.: US 12,699,434 B2
(45) Date of Patent: Aug. 4, 2026

(54) ELECTRONIC DEVICE AND OPERATION METHOD THEREOF

(71) Applicant: Shanghai Zhaoxin Semiconductor Co., Ltd., Shanghai (CN)

(72) Inventor: Long Cheng, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 148 days.

(21) Appl. No.: 18/934,335

(22) Filed: Nov. 1, 2024

(65) Prior Publication Data

US 2026/0010218 A1     Jan. 8, 2026

(30) Foreign Application Priority Data

Jul. 2, 2024     (CN) .......................... 202410882600.9

(51) Int. Cl.
*G06F 1/3228* (2019.01)
*G06F 1/3234* (2019.01)

(52) U.S. Cl.
CPC .......... *G06F 1/3228* (2013.01); *G06F 1/3243* (2013.01)

(58) Field of Classification Search
CPC ..... G06F 1/3228; G06F 1/3243; G06F 1/3287
See application file for complete search history.

(56) References Cited

U.S. PATENT DOCUMENTS

| | | | |
|---|---|---|---|
| 9,021,498 B1 * | 4/2015 | Thimmappa .......... | G06F 9/5077 |
| | | | 718/104 |
| 9,329,947 B2 * | 5/2016 | Elyashev ............ | G06F 11/1484 |
| 11,733,760 B2 | 8/2023 | Wang | |

FOREIGN PATENT DOCUMENTS

CN          113986663 A       1/2022

OTHER PUBLICATIONS

Intel 64 and IA-32 Architectures Software Developer's Manual, vol. 3C: System Programming Guide, Part 3, Jun. 2023 (Year: 2023).*

* cited by examiner

*Primary Examiner* — Raymond N Phan
(74) *Attorney, Agent, or Firm* — McClure, Qualey & Rodack, LLP

(57) ABSTRACT

An operation method of an electronic device is provided. A busy-waiting instruction indicating that the operating system of the processing device is in a busy-waiting state is received. The processing device is in a virtual machine mode. A microcode of the busy-waiting instruction is obtained according to the registered value of the first register. The waiting enabling instruction is generated, and the first counting value corresponding to the waiting enabling instruction and the second counting value corresponding to the first system time are obtained according to the microcode. The first and second counting values are added to generate a third counting value and store it in a second register. According to the waiting enabling instruction, a subsequent microcode is stopped sending to the processing device, so that the processing device enters an idle state, and the counter is enabled to start counting according to the third counting value.

22 Claims, 8 Drawing Sheets

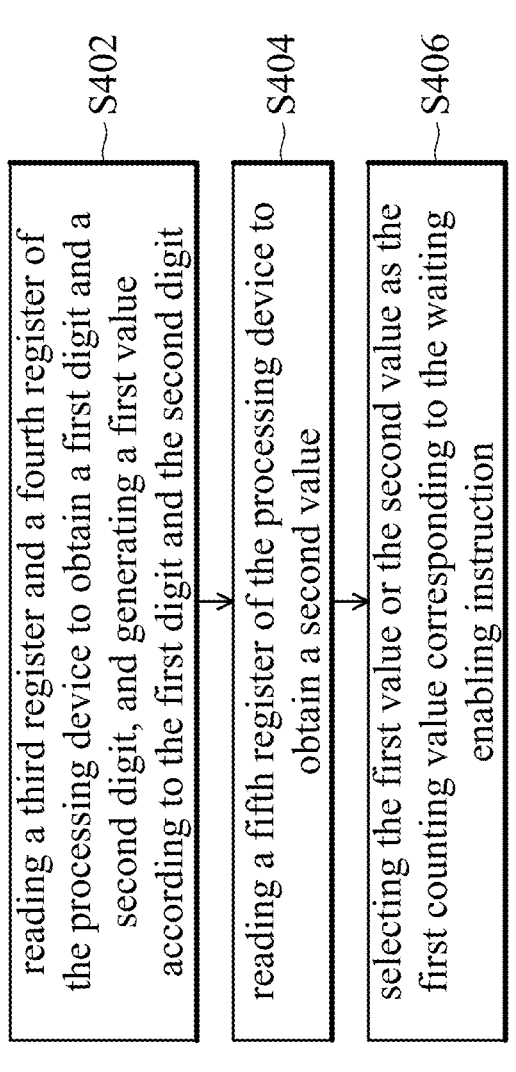

reading a third register and a fourth register of the processing device to obtain a first digit and a second digit, and generating a first value according to the first digit and the second digit ～S402 reading a fifth register of the processing device to obtain a second value ～S404 selecting the first value or the second value as the first counting value corresponding to the waiting enabling instruction ～S406

FIG. 4

ELECTRONIC DEVICE AND OPERATION METHOD THEREOF

CROSS REFERENCE TO RELATED APPLICATIONS

This application claims priority of China Patent Application No. 202410882600.9, filed on Jul. 2, 2024, the entirety of which is incorporated by reference herein.

BACKGROUND OF THE INVENTION

Field of the Invention

The present invention relates to an electronic device, and in particular, it relates to an electronic device and an operation method thereof.

Description of the Related Art

Generally, in processing the kernel code of an operating system of a processor, a situation is often encountered in which the system is busy and the processing must wait, and the busy-waiting time is counted by a time-stamp counter (TSC) inside the processor. However, while the operating system is in the busy-waiting process, a core of the processor is continuously working, so the power consumption of the processor is still high during the time of the busy-waiting process. Therefore, how to control the power consumption of a processor in a busy-waiting state has become a focus for technical improvements by various manufacturers.

BRIEF SUMMARY OF THE INVENTION

The present invention provides an electronic device and an operation method thereof, thereby effectively controlling the power consumption of an electronic device in a busy-waiting state, and causing a busy-waiting instruction to be normally performed in a virtual machine mode.

The present invention provides an operation method of an electronic device, which includes the following steps. A busy-waiting instruction is received, wherein the busy-waiting instruction indicates that the operating system of the processing device is in a busy-waiting state, and the processing device is in a virtual machine mode. A microcode of the busy-waiting instruction is obtained according to the registered value of the first register of the processing device. A waiting enabling instruction is generated, and a first counting value corresponding to the waiting enabling instruction and a second counting value corresponding to a first system time are obtained according to the microcode. The first counting value and the second counting value are added to generate a third counting value and the third counting value is stored in a second register of the processing device. According to the waiting enabling instruction, a subsequent microcode is stopped sending to the processing device, so that the processing device enters an idle state, and the counter is enabled to start counting according to the third counting value.

The present invention additionally provides an electronic device, which includes a processing device and a control device. The processing device is configured to receive a busy-waiting instruction, wherein the busy-waiting instruction indicates that the operating system of the processing device is in a busy-waiting state, and the processing device is in a virtual machine mode, and the processing device is in a virtual machine mode. The processing device is configured to obtain a microcode of the busy-waiting instruction according to the registered value of a first register in the processing device. The processing device is configured to generate a waiting enabling instruction, and obtain the first counting value corresponding to the waiting enabling instruction and a second counting value corresponding to a first system time according to the microcode. The processing device is configured to add the first counting value and the second counting value to generate a third counting value and store the third counting value in a second register of the processing device. The control device is coupled to the processing device and includes a counter. The control device is configured to receive the waiting enabling instruction, and according to the waiting enabling instruction, the control device is configured to stop sending a subsequent microcode instruction to the processing device, so that the processing device enters an idle state, and the counter is enabled to start counting according to the third counting value.

According to the electronic device and the operation method thereof disclosed by the present invention, the processing device receives the busy-waiting instruction, wherein the busy-waiting instruction indicates that the operating system of the processing device is in the busy-waiting state, and the processing device is in the virtual machine mode. The processing device obtains the microcode of the busy-waiting instruction according to the registered value of the first register of the processing device. The processing device generates the waiting enabling instruction, and obtain the first counting value corresponding to the waiting enabling instruction and the second counting value corresponding to the first system time according to the microcode. The processing device adds the first counting value and the second counting value to generate the third counting value and store the third counting value in the second register of the processing device. According to the waiting enabling instruction, the control device stops sending the subsequent microcode instruction to the processing device, so that the processing device enters the idle state, and the counter is enabled to start counting according to the third counting value. Therefore, the power consumption of the electronic device in the busy-waiting state may be effectively controlled, and the busy-waiting instruction is normally performed in the virtual machine mode, so as to increase the convenience of use.

BRIEF DESCRIPTION OF THE DRAWINGS

The present invention can be more fully understood by reading the subsequent detailed description and examples with references made to the accompanying drawings, wherein:

FIG. 4 is a detailed flowchart of a part of step S212 in FIG. 2 and FIG. 3A;

DETAILED DESCRIPTION OF THE INVENTION

In each of the following embodiments, the same reference number represents an element or component that is the same or similar.

Figure 1:
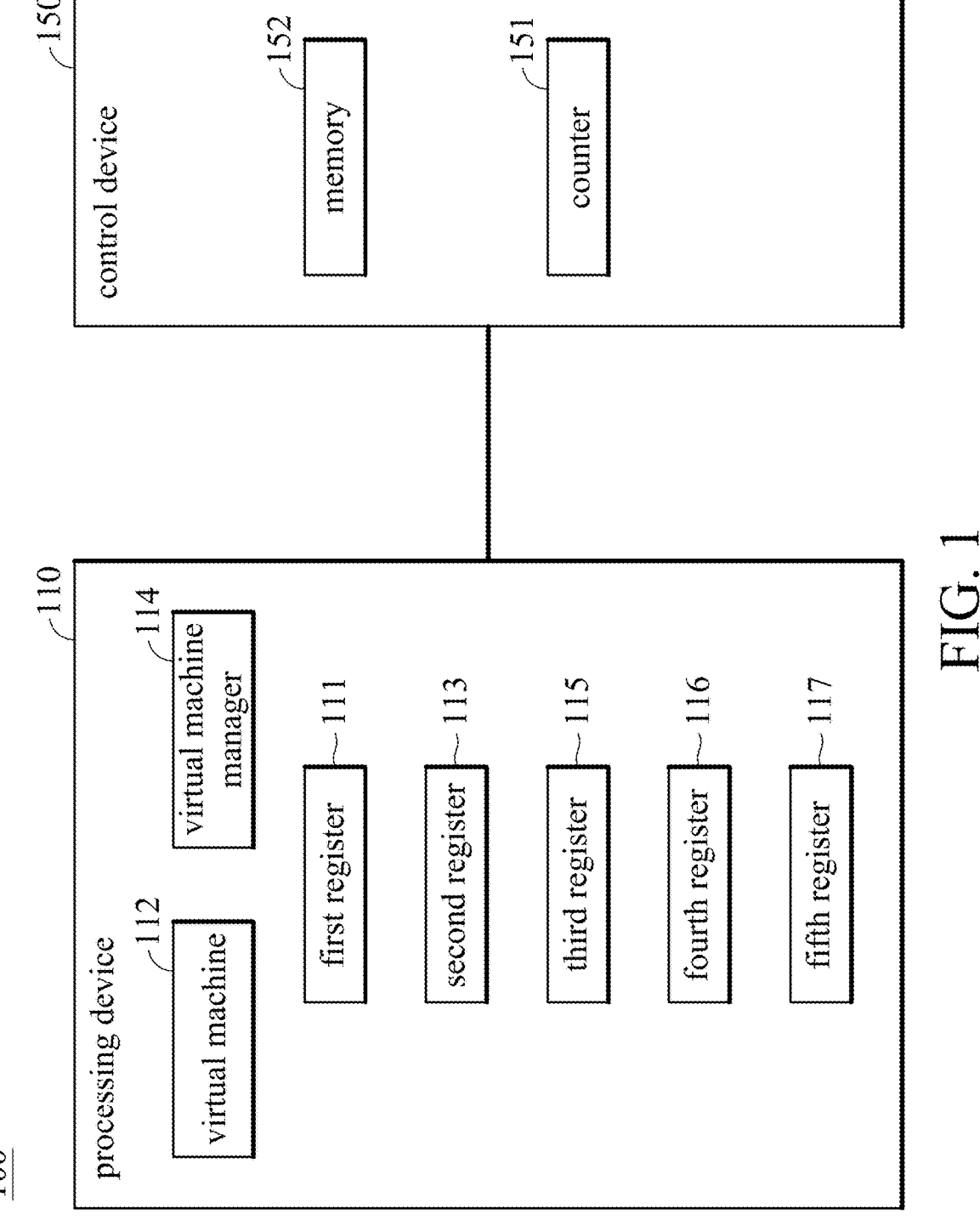
FIG. 1 is a schematic view of an electronic device according to an embodiment of the present invention.

FIG. 1 is a schematic view of an electronic device according to an embodiment of the present invention. Please refer to FIG. 1. The electronic device 100 includes a processing device 110 and a control device 150.

In the embodiment, the processing device 110 may be a central processing unit (CPU) and includes at least one core. The processing device 110 may receive a busy-waiting instruction (such as ZXPAUSE), wherein the busy-waiting instruction indicates that the operating system (OS) of the processing device 110 is in a busy-waiting state. For example, when a kernel code of the operating system of the processing device 110 encounters a busy-waiting situation, the operating system may generate, for example, the busy-waiting instruction to the processing device 110 to indicate the operating system is in the busy-waiting state.

In addition, in the embodiment, the processing device 110 may be in a virtual machine mode. For example, the processing device 110 may performs a first virtual instruction, so that the processing device 110 enters a virtual machine mode and is in the virtual machine mode. In the embodiment, the first virtual instruction is, for example, vmlaunch instruction, and the virtual machine mode is, for example, a virtual machine guest mode (such as vmguest).

Afterward, the processing device 110 may obtain a microcode of the busy-waiting instruction according to the registered value of the first register 111 of the processing device 110. Furthermore, the processing device 110 may determine whether a virtual machine 112 of the processing device 110 supports the busy-waiting instruction according to the registered value of the first register 111 of the processing device 110. In the embodiment, the first register 111 is, for example, a register with a first virtual machine control structure (VMCS), wherein the first virtual machine structure is, for example, VMCS_PROC_BASED_CNTL3. In addition, the first register 111 has 64 bits, wherein "bit 0" is valid, and other bits (such as "bit 1"~"bit 63") are reserved, but the embodiment of the present invention is not limited thereto. In other embodiments, the first register 111 may have 32 bits. Furthermore, "bit 0" may be used to indicate whether the virtual machine 112 of the processing device 110 supports the busy-waiting instruction.

For example, when the value of "bit 0" is "1", it indicates that the virtual machine 112 of the processing device 110 supports the busy-waiting instruction, and the processing device 110 may determine that the virtual machine 112 of the processing device 110 supports the busy-waiting instruction. When the value of "bit 0" is "0", it indicates that the virtual machine 112 of the processing device 110 does not support the busy-waiting instruction, and the processing device 110 may determine that the virtual machine 112 of the processing device 110 does not support the busy-waiting instruction.

When determining that the virtual machine 112 does not support the busy-waiting instruction (i.e., the value of "bit 0" of the first register 111 is "0"), the processing device 110 may generate an unsupported message (such as #UD), which indicates that the processing device 110 may not normally perform the busy-waiting instruction. Accordingly, the processing device 110 may not perform the busy-waiting instruction.

In addition, when determining that the virtual machine 112 supports the busy-waiting instruction (i.e., the value of "bit 0" of the first register 111 is "1"), it indicates that the processing device 110 may normally perform the busy-waiting instruction. At this time, the processing device 110 may obtain the microcode of the busy-waiting instruction according to the busy-waiting instruction. In the embodiment, when the processing device 110 performs the busy-waiting instruction, the processing device 110 may perform, for example, a decoding process on the busy-waiting instruction to obtain the microcode of the busy-waiting instruction.

Afterward, the processing device 110 may generate a waiting enabling instruction (such as wait_nclk_u) and obtain the first counting value corresponding to the waiting enabling instruction and a second counting value corresponding to a first system time according to the microcode. In the embodiment, the above first counting value is used to indicate a waiting time required by the processing device 110 when the operating system is in the busy-waiting state. In addition, the first system time is, for example, a current system time of the virtual machine 112, but the embodiment of the present invention is not limited thereto. Furthermore, the second counting value corresponding to the first system time may be obtained through the processing device 110 reading a register (not shown) according to the microcode.

Then, the processing device 110 may add the first counting value and the second counting value to generate a third counting value, and store the third counting value in a second register 113 of the processing device 110. In some embodiments, the first counting value is, for example, "X", the second counting value is, for example, "Y", the third counting value is, for example, "Z" and "Z=X+Y". In the embodiment, the second register 113 is, for example, a register with a second virtual machine control structure, wherein the second virtual machine control structure is, for example, VMCS_ZXPAUSE_TARGET_TSC. The second register 113 has 64 bits, and is used to store the third counting value, but the embodiment of the present invention is not limited thereto. In other embodiments, the second register 113 may have 32 bits.

In the embodiment, the control device 150 may be a component on a pipeline of a processor, such as a microcode controller (ucode controller). The control device 150 is coupled to the processing device 110 and includes a counter 151. The control device 150 may receive the waiting enabling instruction generated by the processing device 110, and according to the waiting enabling instruction, the control device 150 stops sending a subsequent microcode to the processing device 110, so that the processing device 110 enters an idle state, and the counter 151 is enabled to start counting according to the counting value. That is, during the period when the counter 151 starts counting and the control device 150 stops sending the subsequent microcode to the processing device 110 (i.e., stopping sending the microcode that is in the microcode sequence needing to be processed by the processing device 110 and ranked behind receiving the waiting enabling instruction, wherein the above microcode is the subsequent microcode), then the processing device 110 (such as the core of the processor) may be in an idle state (i.e., the pipeline of the processor may be in an idle state), so as to decrease the power consumption of the processing device 110. In addition, the period of the counter 151 starting counting and the control device 150 stopping sending the subsequent microcode to the processing device 110 110 is a period of the processing device 110 normally performing the busy-waiting instruction. Therefore, the power consumption of the processing device 110 in the busy-waiting state may be effectively controlled, so as to increase the convenience of use.

For example, in some embodiments, when the counter 151 starts counting according to the third counting value (i.e., the period of the processing device 110 normally performing the busy-waiting instruction), the counter 151 may decrease the third counting value, for example, by 1 every cycle. Then, the control device 150 may determine whether the third counting value reaches a predetermined value. In the embodiment, the predetermined value is, for example, 0 but the embodiment of the present invention is not limited thereto.

When the control device 150 determines that the third counting value does not reach the predetermined value (such as 0), the counter 151 continues counting (for example, continuing decreasing the third counting value by 1 every cycle), and the control device 150 continuously stops sending the subsequent microcode to the processing device 110. The processing device 110 is still in the idle state, so as to decrease the power consumption of the processing device 110.

In addition, when determining that the third value reaches the predetermined value (such as 0), it indicates that the processing device 110 normally perform the busy-waiting instruction. At this time, the counter 151 may stop counting, and the control device 150 resumes sending the subsequent microcode to the processing device 110, so that the processing device 110 returns to the normal operation mode. That is, the control device 150 may fetch the subsequent microcode from a memory 152 (such as a microcode read only memory (ucode ROM)) and send the subsequent microcode to the processing device 110 and the processing device 110 may operate normally to process the subsequent microcode sent by the control device 150. It can be seen that during the period when the counter 151 starts counting and the control device 150 stops sending the subsequent microcode to the processing device 110 (i.e., the period of the processing device 110 normally performing the busy-waiting instruction), if the third counting value of the counter 151 reaches the predetermined value, it indicates that the processing device 110 normally perform the busy-waiting instruction, and then the processing device 110 may exit the idle state and return to the normal mode, so as to process the subsequent microcode sent by the control device 150.

In addition, in some embodiments, after the processing device 110 stores the third counting value in the second register 113 of the processing device 110, in a process in which the processing device 110 performs the busy-waiting instruction in the virtual machine mode, the processing device 110 may determine whether the processing device 110 receives a virtual machine exit instruction. For example, the processing device 110 may determine whether the processing device 110 receives a virtual machine exit instruction caused by some external conditions to cause the processing device 110 to exit from the virtual machine mode. In the embodiment, the above virtual machine exit instruction is, for example, vmexit instruction. When determining that the processing device 110 does not receive the virtual machine exit instruction, the processing device 110 may transmit the waiting enabling instruction to the control device 150. Accordingly, according to the waiting enabling instruction, the control device 150 may stop sending the subsequent microcode instruction to the processing device 110, so that the processing device 110 enters an idle state, and the counter 151 is enabled to start counting according to the third counting value.

In some embodiments, when determining that the processing device 110 receives the virtual machine exit instruction, the processing device 110 may exit the virtual machine mode. That is, when the processing device 110 receives, for example, the virtual machine exit instruction caused by some external conditions to cause the processing device 110 to exit from the virtual machine mode, the processing device 110 may exit the virtual machine mode accordingly. In addition, a virtual machine manager (VMM) 114 of the processing device 110 determines whether an instruction pointing message points to the busy-waiting instruction. Furthermore, in some embodiments, the virtual machine manager 114 may further adjust the instruction pointing message corresponding to the virtual machine mode to determine whether the processing device 110 needs to continue performing the busy-waiting instruction when re-entering the virtual machine mode, and determine whether the instruction pointing message points to the busy-waiting instruction. In the embodiment, the instruction pointing message is, for example, guest_rip.

When determining that the instruction pointing message does not point to the busy-waiting instruction, it indicates that the instruction pointing message points to the next instruction of the busy-waiting instruction, and then the virtual machine manager 114 may clear the third counting value, and perform a second virtual machine instruction, so that the processing device 110 enters the virtual machine mode, the counter 151 stops counting, and the control device 150 may resume sending the subsequent microcode to the processing device 110, so that the processing device 110 returns to the normal operation mode and performs the next instruction. At this time, the processing device 110 no longer continues to perform the busy-waiting instruction. In the embodiment, the second virtual machine instruction is, for example, vmresume instruction.

When determining that the instruction pointing message points the busy-waiting instruction, the virtual machine manager 114 may perform the second virtual machine instruction, so that the processing device 110 enters the virtual machine mode, and performs the busy-waiting instruction. Then, the processing device 110 may to obtain a fourth counting value corresponding to a second system time according to the microcode of the busy-waiting instruction. In the embodiment, the second system time is, for example, a current system time of the virtual machine 112, but the embodiment of the present invention is not limited thereto. In addition, the second system time is different from the first system time. Furthermore, the fourth counting value corresponding to the second system time may be obtained through the processing device 110 reading a register (not shown) according to the microcode.

Afterward, the processing device 110 may subtract the fourth counting value from the third counting value to generate a fifth counting value. In the embodiment, the fourth counting value is, for example, "W", the fifth counting value is, for example, "T", and "T=Z–W". Then, according to the waiting enabling instruction, the control device 150 may stop sending the subsequent microcode to the processing device 110, so that the processing device 110 enters an idle state, and the counter 151 is enabled to start counting according to the fifth counting value.

For example, in some embodiments, when the counter 151 starts counting according to the fifth counting value (i.e., the period of the processing device 110 normally performing the busy-waiting instruction), the counter 151 may decrease the fifth counting value, for example, by 1 every cycle. Then, the control device 150 may determine whether the fifth counting value reaches a predetermined value. In the embodiment, the predetermined value is, for example, 0, but the embodiment of the present invention is not limited thereto.

When the control device 150 determines that the fifth counting value does not reach the predetermined value (such as 0), the counter 151 continues counting (for example, continuing decreasing the fifth counting value by 1 every cycle), and the control device 150 continuously stops sending the subsequent microcode to the processing device 110. The processing device 110 is still in the idle state, so as to decrease the power consumption of the processing device 110.

In addition, when determining that the fifth counting value reaches the predetermined value (such as 0), it indicates that the processing device 110 normally performs the busy-waiting instruction. At this time, the counter 151 may stop counting, and the control device 150 resumes sending the subsequent microcode to the processing device 110, so that the processing device 110 returns to the normal operation mode.

In some embodiments, the processing device 110 may further include a third register 115, a fourth register 116 and a fifth register 117. In the embodiment, the third register 115 is, for example, an EDX register, the fourth register 116 is, for example, an EAX register, and the fifth register 117 is, for example, a model-specific register (MSR), but the embodiment of the present invention is not limited thereto.

When the processing device 110 generates the waiting enabling instruction according to the microcode, the processing device 110 may read the third register 115 and the fourth register 116 of the processing device 110 to obtain a first digit of the third register 115 and a second digit of the fourth register 116, and generate a first value according to the first digit and the second digit. In the embodiment, the first digit is, for example, low 32 bits, the second digit is, for example, high 32 bits, and the first value (such as (EDX: EAX)) is, for example, 64, but the embodiment of the present invention is not limited thereto.

That is, after the processing device 110 reads the third register 115 and the fourth register 116, the processing device 100 may combine the first digit of the third register 115 and the second digit of the fourth register 116 to form the first value, so that the above first value may be used as a waiting time required by the processing device 110 when the operating system is in the busy-waiting state. In addition, the above first value may be configured, for example, by a software executed by the processing device 110

Then, the processing device 110 may read the fifth register 117 of the processing device 110 to obtain a second value. In the embodiment, the second value may be used as a waiting time required by the processing device 110 when the operating system is in the busy-waiting state. In addition, the above second value may also be configured, for example, by the software executed by the processing device 110 and through the fifth register 117.

Afterward, when the processing device 110 obtains the first value and the second value, the processing device 110 may select the first value or the second value as the first counting value corresponding to the waiting enabling instruction. For example, the processing device 110 may select the first value or the second value as the first counting value corresponding to the waiting enabling instruction according to the magnitude of the first value and the second value. That is, when the processing device 110 obtains the first value and the second value, the processing device 110 may determine whether the first value is greater than the second value. When determining that the first value is greater than the second value, the processing device 110 may select the second value as the first counting value corresponding to the waiting enabling instruction. When the first value is not greater than the second value, the processing device 110 may select the first value as the first counting value corresponding to the waiting enabling instruction.

Figure 2:
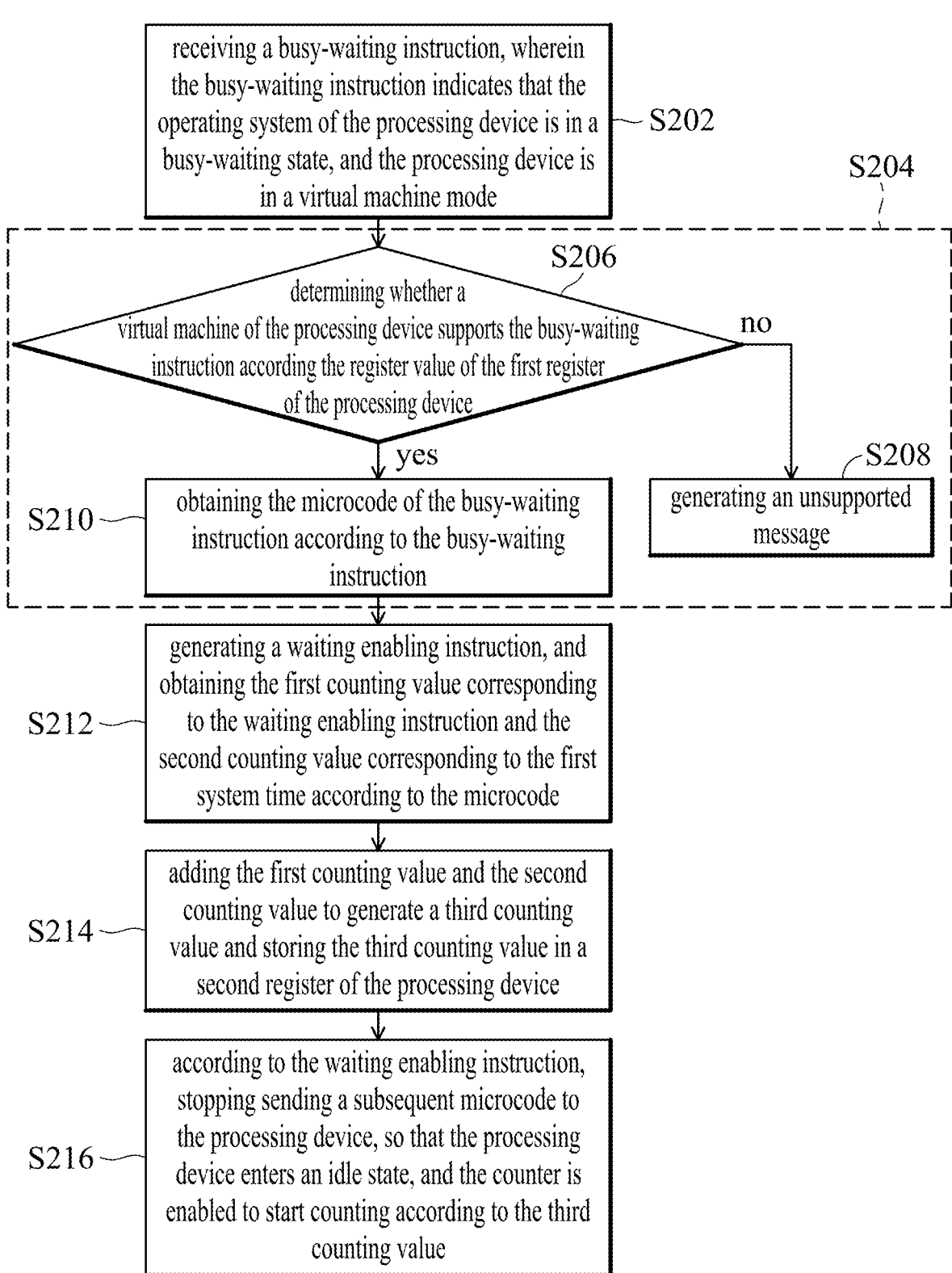
FIG. 2 is a flowchart of an operation method of an electronic device according to an embodiment of the present invention.

FIG. 2 is a flowchart of an operation method of an electronic device according to an embodiment of the present invention. In step S202, the method involves receiving a busy-waiting instruction, wherein the busy-waiting instruction indicates that the operating system of the processing device is in a busy-waiting state, and the processing device is in a virtual machine mode.

In step S204, the method involves obtaining a microcode of the busy-waiting instruction according to the registered value of the first register of the processing device. In some embodiments, step S204 may further include steps S206, S208 and S210. In step S206, the method involves determining whether a virtual machine of the processing device supports the busy-waiting instruction according the register value of the first register of the processing device. When determining that the virtual machine does not support the busy-waiting instruction, the method performs step S208. In step S208, the method involves generating an unsupported message. When determining that the virtual machine supports the busy-waiting instruction, the method performs step S210. In step S210, the method involves obtaining the microcode of the busy-waiting instruction according to the busy-waiting instruction.

In step S212, the method involves generating a waiting enabling instruction, and obtaining the first counting value corresponding to the waiting enabling instruction and the second counting value corresponding to the first system time according to the microcode. In step S214, the method involves adding the first counting value and the second counting value to generate a third counting value and storing the third counting value in a second register of the processing device. In step S216, the method involves according to the waiting enabling instruction, stopping sending a subsequent microcode to the processing device, so that the processing device enters an idle state, and the counter is enabled to start counting according to the third counting value.

Figure 3A:
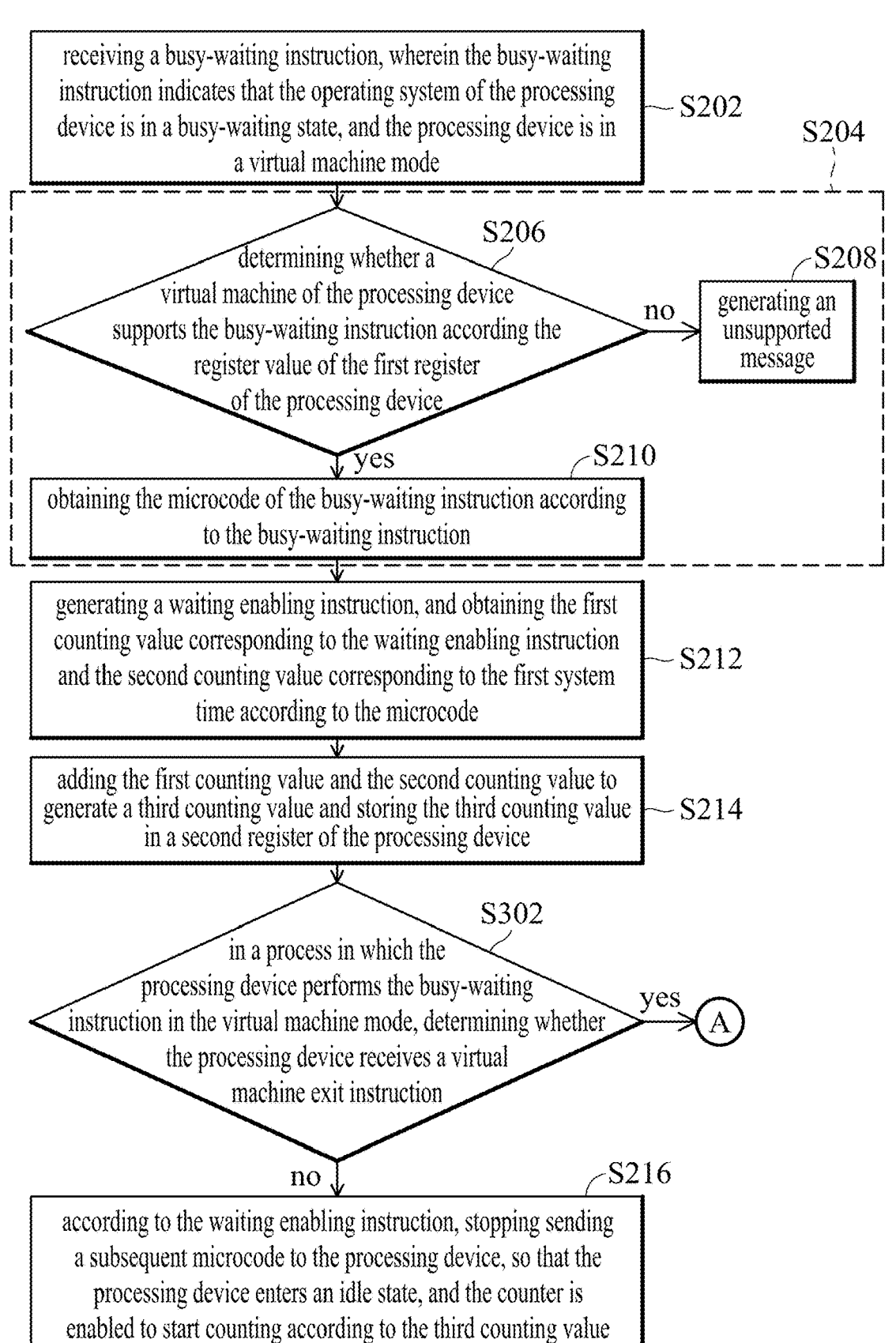
FIGS. 3A and 3B are a flowchart of an operation method of an electronic device according to another embodiment of the present invention.
Figure 3B:
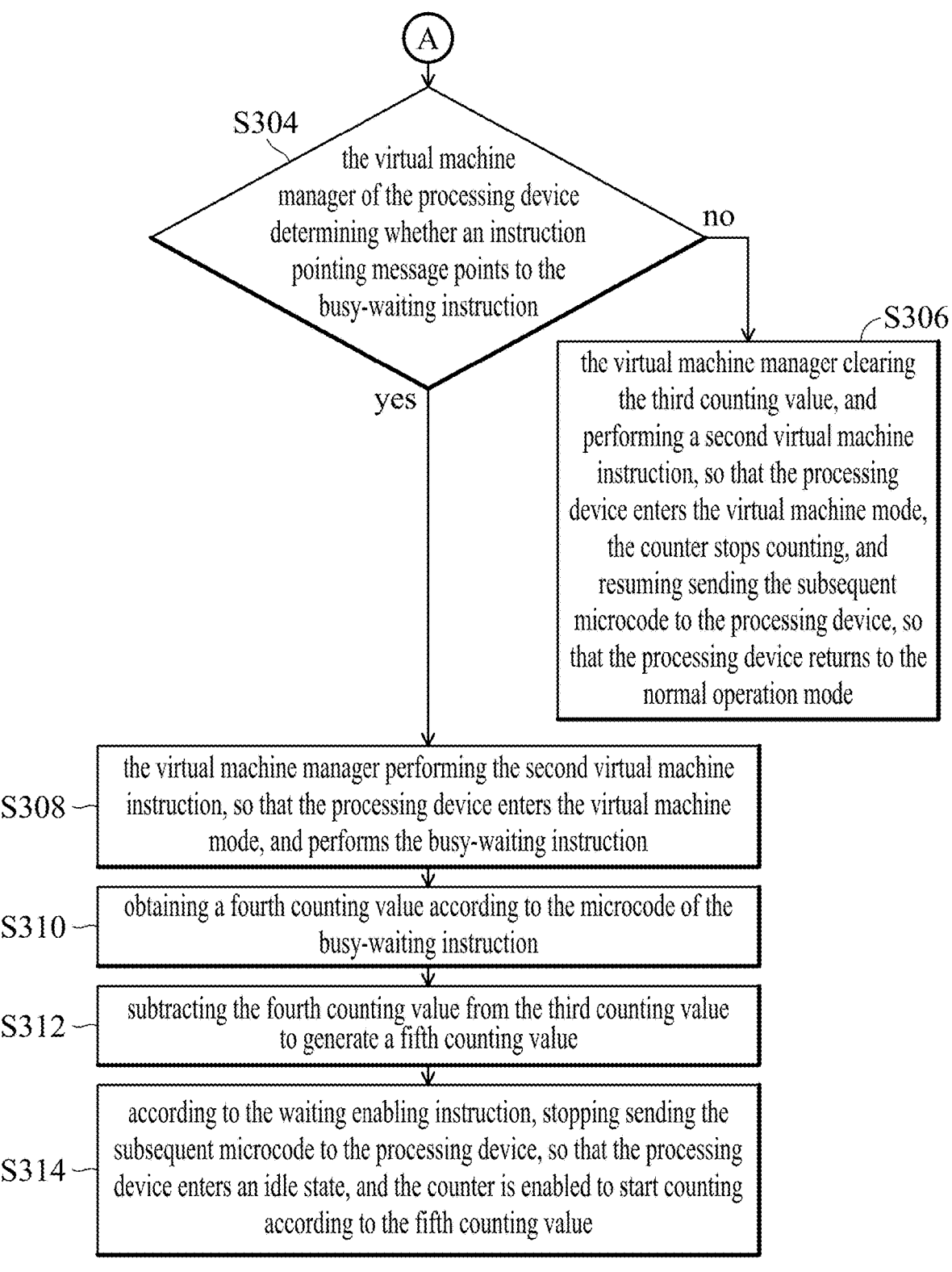

FIGS. 3A and 3B are a flowchart of an operation method of an electronic device according to another embodiment of the present invention. In the embodiment, steps S202~S216 in FIG. 3A are the same as or similar to steps S202~S216 in FIG. 2. Accordingly, steps S202~S216 in FIG. 3A may refer to the description of the embodiment of FIG. 2, and the description thereof is not repeated herein. In step S302, the method involves in a process in which the processing device performs the busy-waiting instruction in the virtual machine mode, determining whether the processing device receives a virtual machine exit instruction. When determining that the processing device does not receive the virtual machine exit instruction, the method performs step S216. In step S216, the method involves according to the waiting enabling instruction, stopping sending the subsequent microcode to the processing device, so that the processing device enters the idle state, and the counter is enabled to start counting according to the third counting value. When determining that the processing device receives the virtual machine exit instruction, the method perform step S304. In step S304, the method involves the virtual machine manager of the processing device determining whether an instruction pointing message points to the busy-waiting instruction. In some embodiments, step S304 further include the virtual machine manager adjusting the instruction pointing message corresponding to the virtual machine mode to determine whether the processing device needs to continue performing the busy-waiting instruction when re-entering the virtual machine mode, and determining whether the instruction pointing message points to the busy-waiting instruction.

When determining that the instruction pointing message does not point to the busy-waiting instruction, the method performs step S306. In step S306, the method involves the virtual machine manager clearing the third counting value, and performing a second virtual machine instruction, so that the processing device enters the virtual machine mode, the counter stops counting, and resuming sending the subsequent microcode to the processing device, so that the processing device returns to the normal operation mode. When determining that the instruction pointing message points the busy-waiting instruction, the method performs step S308. In step S308, the method involves the virtual machine manager performing the second virtual machine instruction, so that the processing device enters the virtual machine mode, and performs the busy-waiting instruction. In step S310, the method involves obtaining a fourth counting value according to the microcode of the busy-waiting instruction.

In step S312, the method involves subtracting the fourth counting value from the third counting value to generate a fifth counting value. In step S314, the method involves according to the waiting enabling instruction, stopping sending the subsequent microcode to the processing device, so that the processing device enters an idle state, and the counter is enabled to start counting according to the fifth counting value.

FIG. 4 is a detailed flowchart of a part of step S212 in FIG. 2 and FIG. 3A. In step S402, the method involves reading a third register and a fourth register of the processing device to obtain a first digit and a second digit, and generating a first value according to the first digit and the second digit. In step S404, the method involves reading a fifth register of the processing device to obtain a second value. In step S406, the method involves selecting the first value or the second value as the first counting value corresponding to the waiting enabling instruction. In the embodiment, the third register is, for example, an EDX register, the fourth register is, for example, an EAX register, and the fifth register is, for example, a model-specific register.

Figure 5:
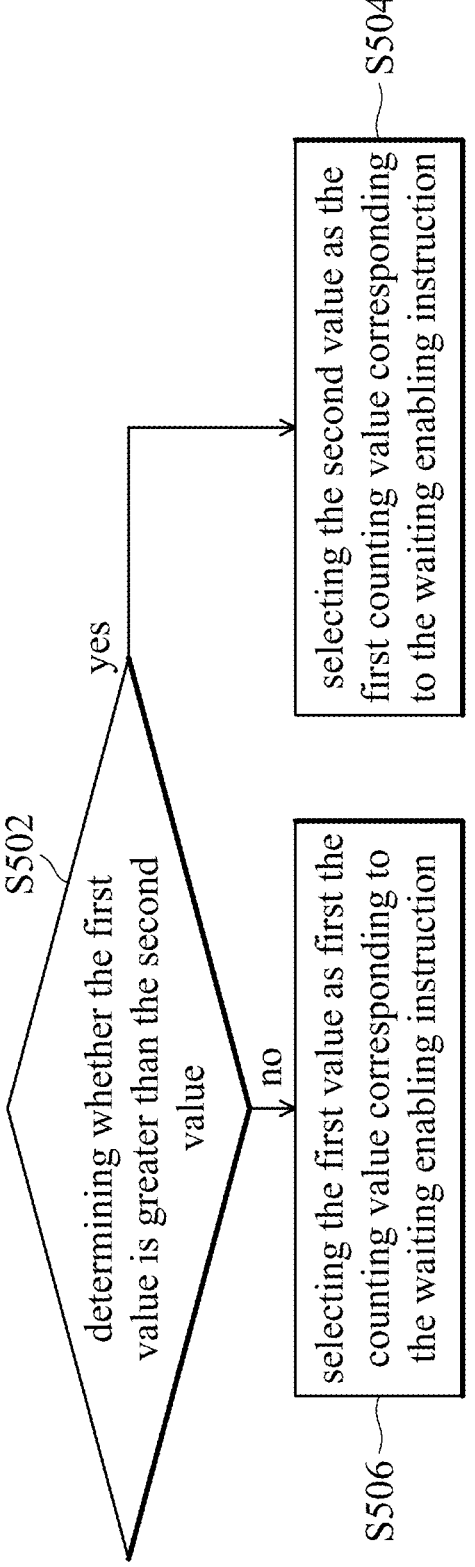
FIG. 5 is a detailed flowchart of step S406 in FIG. 4.

FIG. 5 is a detailed flowchart of step S406 in FIG. 4. In step S502, the method involves determining whether the first value is greater than the second value. When determining that the first value is greater than the second value, the method performs step S504. In step S504, the method involves selecting the second value as the first counting value corresponding to the waiting enabling instruction. When determining that the first value is not greater than the second value, the method performs step S506. In step S506, the method involves selecting the first value as first the counting value corresponding to the waiting enabling instruction.

Figure 6:
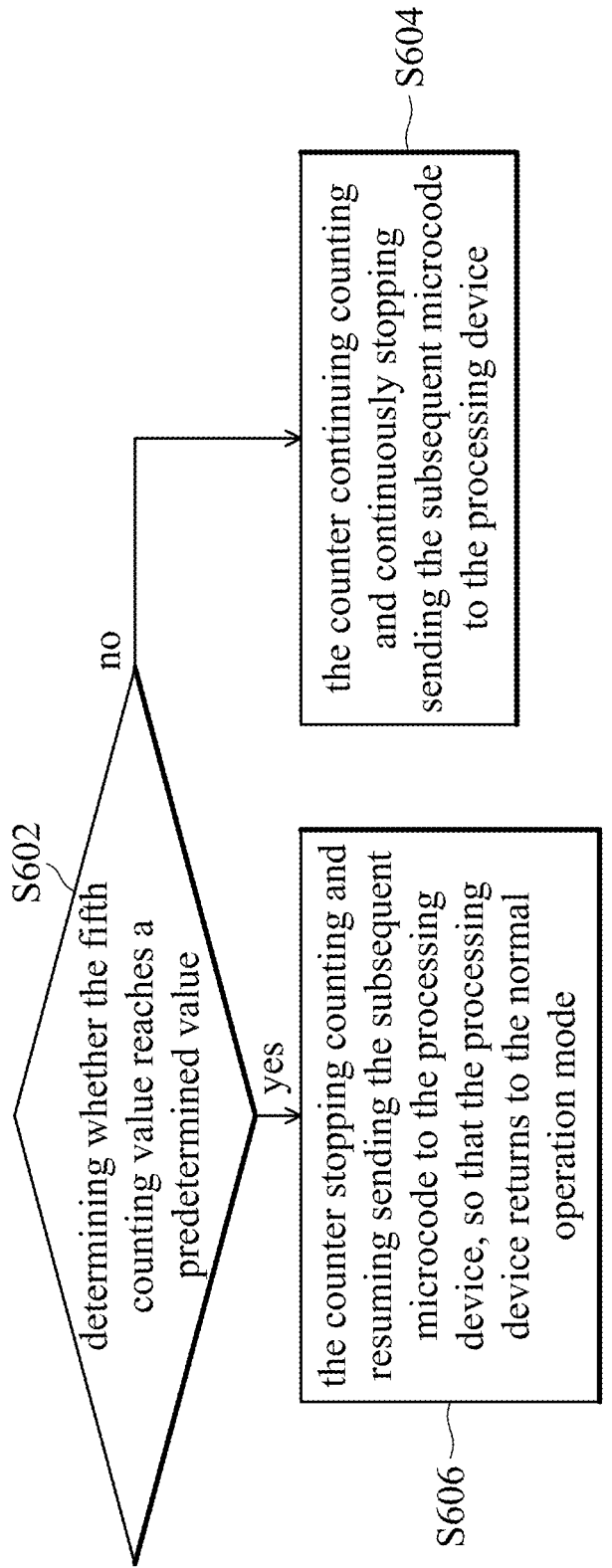
FIG. 6 is a flowchart following step S314 in FIG. 3B.

FIG. 6 is a flowchart following step S314 in FIG. 3B. In step S602, the method involves determining whether the fifth counting value reaches a predetermined value. When determining that the fifth counting value does not reach the predetermined value, the method performs step S604. In step S604, the method involves the counter continuing counting and continuously stopping sending the subsequent microcode to the processing device. When determining that the fifth counting value reaches the predetermined value, the method performs step S606. In step S606, the method involves the counter stopping counting and resuming sending the subsequent microcode to the processing device, so that the processing device returns to the normal operation mode.

Figure 7:
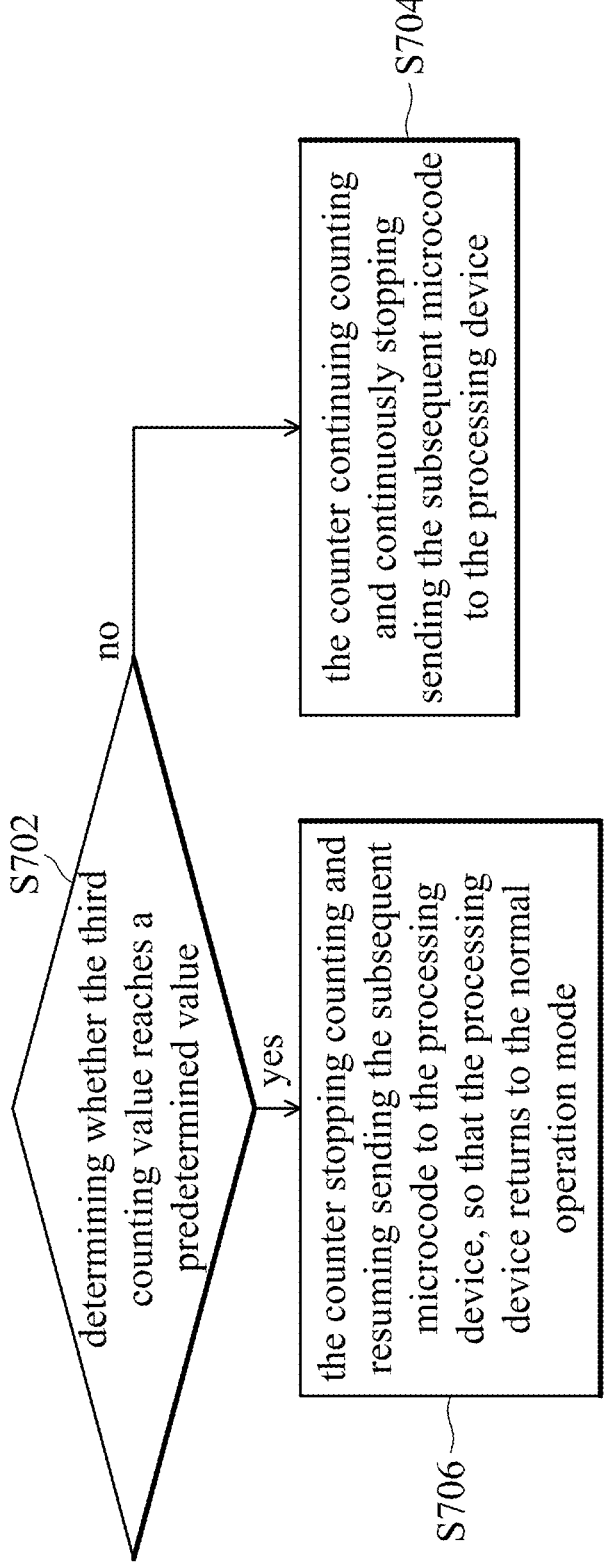
FIG. 7 is a flowchart following step S216 in FIG. 2 and FIG. 3A.

FIG. 7 is another flowchart following step S216 in FIG. 2 and FIG. 3A. In step S702, the method involves determining whether the third counting value reaches a predetermined value. When determining that the third counting value does not reach the predetermined value, the method performs step S704. In step S704, the method involves the counter continuing counting and continuously stopping sending the subsequent microcode to the processing device. When determining that the third counting value reaches the predetermined value, the method involves step S706, the method involves the counter stopping counting and resuming sending the subsequent microcode to the processing device, so that the processing device returns to the normal operation mode.

It should be noted that the order of the steps in FIG. 2, FIG. 3A, FIG. 3B, FIG. 4, FIG. 5, FIG. 6 and FIG. 7 is only for illustrative purposes, and is not intended to limit the order of the steps of the present disclosure. The user may change the order of the steps above according the requirement thereof. The flowcharts described above may add additional steps or use fewer steps without departing from the spirit and scope of the present disclosure.

In summary, according to the electronic device and the operation method thereof disclosed by the present invention, the processing device receives the busy-waiting instruction, wherein the busy-waiting instruction indicates that the operating system of the processing device is in the busy-waiting state, and the processing device is in the virtual machine mode. The processing device obtains the microcode of the busy-waiting instruction according to the registered value of the first register of the processing device. The processing device generates the waiting enabling instruction, and obtain the first counting value corresponding to the waiting enabling instruction and the second counting value corresponding to the first system time according to the microcode. The processing device adds the first counting value and the second counting value to generate the third counting value and store the third counting value in the second register of the processing device. According to the waiting enabling instruction, the control device stops sending the subsequent microcode instruction to the processing device, so that the processing device enters the idle state, and the counter is enabled to start counting according to the third counting value. Therefore, the power consumption of the electronic device in the busy-waiting state may be effectively controlled, and the busy-waiting instruction is normally performed in the virtual machine mode, so as to increase the convenience of use.

In addition, in the embodiment, when determining that the virtual machine exit instruction is received and determining that the instruction pointing message points the busy-waiting instruction, the virtual machine manager performs the second virtual machine instruction, so that the processing device enters the virtual machine mode, and performs the busy-waiting instruction. Then, the processing device obtains the fourth counting value according to the microcode of the busy-waiting instruction. The fourth counting value is subtracted from the third counting value to generate the fifth counting value. Then, according to the waiting enabling instruction, the control device may stop sending the subsequent microcode to the processing device, so that the processing device enters an idle state, and the counter is enabled to start counting according to the fifth counting value. Therefore, when the processing device exits the virtual machine mode and re-enters the virtual machine mode in the process of performing the busy-waiting instruction, the processing device may calculate the performing time of the busy-waiting instruction, thereby ensuring the accuracy of the performing time of the busy-waiting instruction in the virtual machine mode.

While the invention has been described by way of example and in terms of the preferred embodiments, it should be understood that the invention is not limited to the disclosed embodiments.

What is claimed is:

1. An operation method of an electronic device, comprising:

receiving a busy-waiting instruction, wherein the busy-waiting instruction indicates that an operating system of a processing device is in a busy-waiting state, and the processing device is in a virtual machine mode;

obtaining a microcode of the busy-waiting instruction according to a registered value of a first register of the processing device;

generating a waiting enabling instruction, and obtaining a first counting value corresponding to the waiting enabling instruction and a second counting value corresponding to a first system time according to the microcode;

adding the first counting value and the second counting value to generate a third counting value and storing the third counting value in a second register of the processing device;

according to the waiting enabling instruction, stopping sending a subsequent microcode to the processing device, so that the processing device enters an idle state, and the counter is enabled to start counting according to the third counting value.

2. The operation method of the electronic device as claimed in claim 1, wherein the step of obtaining the microcode of the busy-waiting instruction according to the registered value of the first register of the processing device comprises:

determining whether a virtual machine of the processing device supports the busy-waiting instruction according the register value of the first register of the processing device;

when determining that the virtual machine supports the busy-waiting instruction, obtaining the microcode of the busy-waiting instruction according to the busy-waiting instruction; and when determining that the virtual machine does not support the busy-waiting instruction, generating an unsupported message.

3. The operation method of the electronic device as claimed in claim 1, further comprising:

in a process in which the processing device performs the busy-waiting instruction in the virtual machine mode, determining whether the processing device receives a virtual machine exit instruction; and when determining that the processing device does not receive the virtual machine exit instruction, entering the step of according to the waiting enabling instruction, stopping sending the subsequent microcode to the processing device, so that the processing device enters the idle state, and the counter is enabled to start counting according to the third counting value.

4. The operation method of the electronic device as claimed in claim 1, further comprising:

determining whether the third counting value reaches a predetermined value;

when determining that the third counting value does not reach the predetermined value, the counter continuing counting and continuously stopping sending the subsequent microcode to the processing device; and when determining that the third counting value reaches the predetermined value, the counter stopping counting and resuming sending the subsequent microcode to the processing device, so that the processing device returns to a normal operation mode.

5. The operation method of the electronic device as claimed in claim 1, wherein the step of obtaining the first counting value corresponding to the waiting enabling instruction comprises:

reading a third register and a fourth register of the processing device to obtain a first digit and a second digit, and generating a first value according to the first digit and the second digit;

reading a fifth register of the processing device to obtain a second value; and selecting the first value or the second value as the first counting value corresponding to the waiting enabling instruction.

6. The operation method of the electronic device as claimed in claim 1, wherein the first register is a register with a first virtual machine control structure, the registered value of the first register is used to indicate whether the processing device supports the busy-waiting instruction, the second register is a register with a second virtual machine control structure, the second register is used to store the third counting value, and the first virtual machine control structure is different from the second virtual machine control structure.

7. The operation method of the electronic device as claimed in claim 3, further comprising:

when determining that the processing device receives the virtual machine exit instruction, a virtual machine manager of the processing device determining whether an instruction pointing message points to the busy-waiting instruction;

when determining that the instruction pointing message does not point to the busy-waiting instruction, the virtual machine manager clearing the third counting value, and performing a second virtual machine instruction, so that the processing device enters the virtual machine mode, the counter stops counting, and resuming sending the subsequent microcode to the processing device, so that the processing device returns to a normal operation mode;

when determining that the instruction pointing message points the busy-waiting instruction, the virtual machine manager performs the second virtual machine instruction, so that the processing device enters the virtual machine mode, and performs the busy-waiting instruction;

obtaining a fourth counting value according to the microcode of the busy-waiting instruction;

subtracting the fourth counting value from the third counting value to generate a fifth counting value;

according to the waiting enabling instruction, stopping sending the subsequent microcode to the processing device, so that the processing device enters an idle state, and the counter is enabled to start counting according to the fifth counting value.

8. The operation method of the electronic device as claimed in claim 5, wherein the step of selecting the first value or the second value as the first counting value corresponding to the waiting enabling instruction comprises:

determining whether the first value is greater than the second value;

when determining that the first value is greater than the second value, selecting the second value as the first counting value corresponding to the waiting enabling instruction; and when determining that the first value is not greater than the second value, selecting the first value as first the counting value corresponding to the waiting enabling instruction.

9. The operation method of the electronic device as claimed in claim 5, wherein the third register is an EDX register, the fourth register is an EAX register, and the fifth register is a model-specific register.

10. The operation method of the electronic device as claimed in claim 7, wherein the step of the virtual machine manager of the processing device determining whether the instruction pointing message points to the busy-waiting instruction comprises:

the virtual machine manager adjusting the instruction pointing message corresponding to the virtual machine mode to determine whether the processing device needs to continue performing the busy-waiting instruction when re-entering the virtual machine mode, and determining whether the instruction pointing message points to the busy-waiting instruction.

11. The operation method of the electronic device as claimed in claim 7, further comprising:

determining whether the fifth counting value reaches a predetermined value;

when determining that the fifth counting value does not reach the predetermined value, the counter continuing counting and continuously stopping sending the subsequent microcode to the processing device; and when determining that the fifth counting value reaches the predetermined value, the counter stopping counting and resuming sending the subsequent microcode to the processing device, so that the processing device returns to a normal operation mode.

12. An electronic device, comprising:

a processing device, configured to receive a busy-waiting instruction, wherein the busy-waiting instruction indicates that an operating system of the processing device is in a busy-waiting state, and the processing device is in a virtual machine mode, the processing device is configured to obtain a microcode of the busy-waiting instruction according to a registered value of a first register of the processing device, the processing device is configured to generate a waiting enabling instruction, and to obtain a first counting value corresponding to the waiting enabling instruction and a second counting value corresponding to a first system time according to the microcode, and the processing device is configured to add the first counting value and the second counting value to generate a third counting value and store the third counting value in a second register of the processing device; and a control device, coupled to the processing device and comprising a counter, wherein the control device is configured to receive the waiting enabling instruction, and according to the waiting enabling instruction, the control device is configured to stop sending a subsequent microcode instruction to the processing device, so that the processing device enters an idle state, and the counter is enabled to start counting according to the third counting value.

13. The electronic device as claimed in claim 12, wherein the processing device is configured to determine whether a virtual machine of the processing device supports the busy-waiting instruction according the register value of the first register of the processing device, when determining that the virtual machine supports the busy-waiting instruction, the processing device is configured to obtain the microcode of the busy- waiting instruction according to the busy-waiting instruction, and when determining that the virtual machine does not support the busy-waiting instruction, the processing device is configured to generate an unsupported message.

14. The electronic device as claimed in claim 12, wherein in a process in which the processing device performs the busy-waiting instruction in the virtual machine mode, the processing device is configured to determine whether the processing device receives a virtual machine exit instruction;

when determining that the processing device does not receive the virtual machine exit instruction, the processing device is configured to transmit the waiting enabling instruction to the control device.

15. The electronic device as claimed in claim 12, wherein the control device is configured to determine whether the third counting value reaches a predetermined value;

when determining that the third counting value does not reach the predetermined value, the counter continues counting and continuously stops sending the subsequent microcode to the processing device;

when determining that the third counting value reaches the predetermined value, the counter stops counting and resumes sending the subsequent microcode to the processing device, so that the processing device returns to a normal operation mode.

16. The electronic device as claimed in claim 12, wherein the processing device is configured to read a third register and a fourth register of the processing device to obtain a first digit and a second digit, and to generate a first value according to the first digit and the second digit;

the processing device is configured to read a fifth register of the processing device to obtain a second value;

the processing device is configured to select the first value or the second value as the first counting value corresponding to the waiting enabling instruction.

17. The electronic device as claimed in claim 12, wherein the first register is a register with a first virtual machine control structure, the registered value of the first register is used to indicate whether the processing device supports the busy-waiting instruction, the second register is a register with a second virtual machine control structure, the second register is used to store the third counting value, and the first virtual machine control structure is different from the second virtual machine control structure.

18. The electronic device as claimed in claim 14, wherein when determining that the processing device receives the virtual machine exit instruction, a virtual machine manager of the processing device is configured to determine whether an instruction pointing message points to the busy-waiting instruction;

when determining that the instruction pointing message does not point to the busy-waiting instruction, the virtual machine manager is configured to clear the third counting value, and to perform a second virtual machine instruction, so that the processing device enters the virtual machine mode, the counter stops counting, and the control device is configured to resume sending the subsequent microcode to the processing device, so that the processing device returns to a normal operation mode;

when determining that the instruction pointing message points the busy-waiting instruction, the virtual machine manager is configured to perform the second virtual machine instruction, so that the processing device enters the virtual machine mode, and performs the busy-waiting instruction;

the processing device is configured to obtain a fourth counting value corresponding to a second system time according to the microcode of the busy-waiting instruction;

the processing device is configured to subtract the fourth counting value from the third counting value to generate a fifth counting value;

according to the waiting enabling instruction, the control device is configured to stop sending the subsequent microcode to the processing device, so that the processing device enters an idle state, and the counter is enabled to start counting according to the fifth counting value.

19. The electronic device as claimed in claim 16, wherein the processing device is configured to determine whether the first value is greater than the second value;

when determining that the first value is greater than the second value, the processing device is configured to select the second value as the first counting value corresponding to the waiting enabling instruction;

when determining that the first value is not greater than the second value, the processing device is configured to select the first value as first the counting value corresponding to the waiting enabling instruction.

20. The electronic device as claimed in claim 19, wherein the third register is an EDX register, the fourth register is an EAX register, and the fifth register is a model-specific register.

21. The electronic device as claimed in claim 18, wherein the virtual machine manager is further configured to adjust the instruction pointing message corresponding to the virtual machine mode to determine whether the processing device needs to continue performing the busy-waiting instruction when re-entering the virtual machine mode, and to determine whether the instruction pointing message points to the busy-waiting instruction.

22. The electronic device as claimed in claim 18, wherein the control device is configured to determine whether the fifth counting value reaches a predetermined value;

when determining that the fifth counting value does not reach the predetermined value, the counter continues counting and continuously stops sending the subsequent microcode to the processing device;

when determining that the fifth counting value reaches the predetermined value, the counter stops counting and resumes sending the subsequent microcode to the processing device, so that the processing device returns to the normal operation mode.

* * * * *